US008882370B2

United States Patent
Oishi et al.

(10) Patent No.: US 8,882,370 B2
(45) Date of Patent: Nov. 11, 2014

(54) FOCAL PLANE SHUTTER AND OPTICAL DEVICE

(71) Applicant: Seiko Precision Inc., Narashino (JP)

(72) Inventors: Seiichi Oishi, Narashino (JP); Shoichi Tokura, Narashino (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 14/175,280

(22) Filed: Feb. 7, 2014

(65) Prior Publication Data

US 2014/0286632 A1    Sep. 25, 2014

(30) Foreign Application Priority Data

Mar. 22, 2013    (JP) .................................. 2013-060209

(51) Int. Cl.
*G03B 9/08*    (2006.01)

(52) U.S. Cl.
USPC ......................................... 396/463; 396/469

(58) Field of Classification Search
USPC ............ 396/463, 469; 348/363; 359/738–740
See application file for complete search history.

(56) References Cited

U.S. PATENT DOCUMENTS

| 5,664,247 A | * | 9/1997 | Hasuda et al. ................ 396/456 |
| 2004/0213561 A1 | * | 10/2004 | Ichinose et al. ................ 396/487 |
| 2007/0237518 A1 | | 10/2007 | Ichihara | |

FOREIGN PATENT DOCUMENTS

| JP | H06-26211 U | 4/1994 |
| JP | 2004-29277 A1 | 1/2004 |
| JP | 2007-127715 A1 | 5/2007 |
| JP | 2007-232889 A1 | 9/2007 |
| JP | 2007-293293 A1 | 11/2007 |
| JP | 2008-175254 A1 | 7/2008 |

* cited by examiner

*Primary Examiner* — Rochelle-Ann J Blackman
(74) *Attorney, Agent, or Firm* — Kratz, Quintos & Hanson, LLP (57) ABSTRACT

A focal plane shutter includes: a board including an opening; a blade opening or closing the opening; an electromagnet including an iron core and a coil for energizing the iron core; and a drive lever holding an iron piece capable of being adsorbed to the iron core, capable of moving such that iron piece is moved into and away from the iron core, and driving the blade, wherein a plating process is performed on the iron core and the iron piece, a Vickers hardness of a plating of the iron piece is greater than that of a plating of the iron core, and a difference in the Vickers hardness between the plating of the iron piece and the plating of the iron core is 100 HV or more.

6 Claims, 7 Drawing Sheets

FOCAL PLANE SHUTTER AND OPTICAL DEVICE

CROSS-REFERENCE TO RELATED APPLICATION

This application is based upon and claims the benefit of priority of the prior Japanese Patent Application No. 2013-060209, filed on Mar. 22, 2013, the entire contents of which are incorporated herein by reference.

BACKGROUND (i) Technical Field

The present invention relates to focal plane shutters and optical device.

(ii) Related Art

A focal plane shutter is equipped with: an iron core of an electromagnet; and a drive lever holding an iron piece, the magnetic attraction force being generated between the iron piece and the electromagnet. The drive lever drives blades. The drive lever is biased by a biasing member such that the iron piece is moved away from the iron core of the electromagnet. The electromagnet is energized in a state where the iron piece abuts the iron core, so that the magnetic attraction force is generated between the iron piece and the iron core. Thus, the iron piece is adsorbed to and held by the iron core against the biasing force of the biasing member. The energization of the electromagnet is stopped in the state where the iron piece is adsorbed to the iron core, so that the adsorption force of the iron piece to the iron core is lower than the biasing force of the biasing member. Thus, the drive lever moves in accordance with the biasing force of the biasing member such that the iron piece is moved away from the iron core. In this way, the drive lever drives the blades by use of the magnetic attraction force of the electromagnet and the biasing force of the biasing member. Japanese Unexamined Patent Application Publication No. 2004-029277 discloses such a focal plane shutter.

The iron piece of the drive lever repeatedly abuts the iron core of the electromagnet, so that the adsorption force of the iron piece to the iron core might decrease. This is conceivably because the repeated abutment of the iron piece with the iron core might cause abrasion of the adsorption surface of the iron piece, so that the adsorption surface might be made uneven or the adsorption surface might be attached with abrasion powder.

The adsorption force of the iron piece to the iron core decreases in this way. This shortens the period from the time when the energization of the electromagnet is stopped to the time when the iron piece is moved away from the iron core by making the adsorption force lower than the biasing force of the biasing member. Thus, the speed of the blades also changes to increase the error between the actual exposure period and the desired exposure period assumed beforehand. Thus, the image quality might be influenced.

Further, the same problem might occur in a self-holding electromagnet in which a magnet is secured to an iron core, an iron piece can be adsorbed to the iron core in a non-energized state, and the adsorption force can be reduced by energization.

SUMMARY

It is therefore an object of the present invention to provide a focal plane shutter and an optical device that suppress an error of an exposure period from increasing.

According to an aspect of the present invention, there is provided a focal plane shutter including: a board including an opening; a blade opening or closing the opening; an electromagnet including an iron core and a coil for energizing the iron core; and a drive lever holding an iron piece capable of being adsorbed to the iron core, capable of moving such that iron piece is moved into and away from the iron core, and driving the blade, wherein a plating process is performed on the iron core and the iron piece, a Vickers hardness of a plating of the iron piece is greater than that of a plating of the iron core, and a difference in the Vickers hardness between the plating of the iron piece and the plating of the iron core is 100 HV or more.

DETAILED DESCRIPTION

Figure 1:
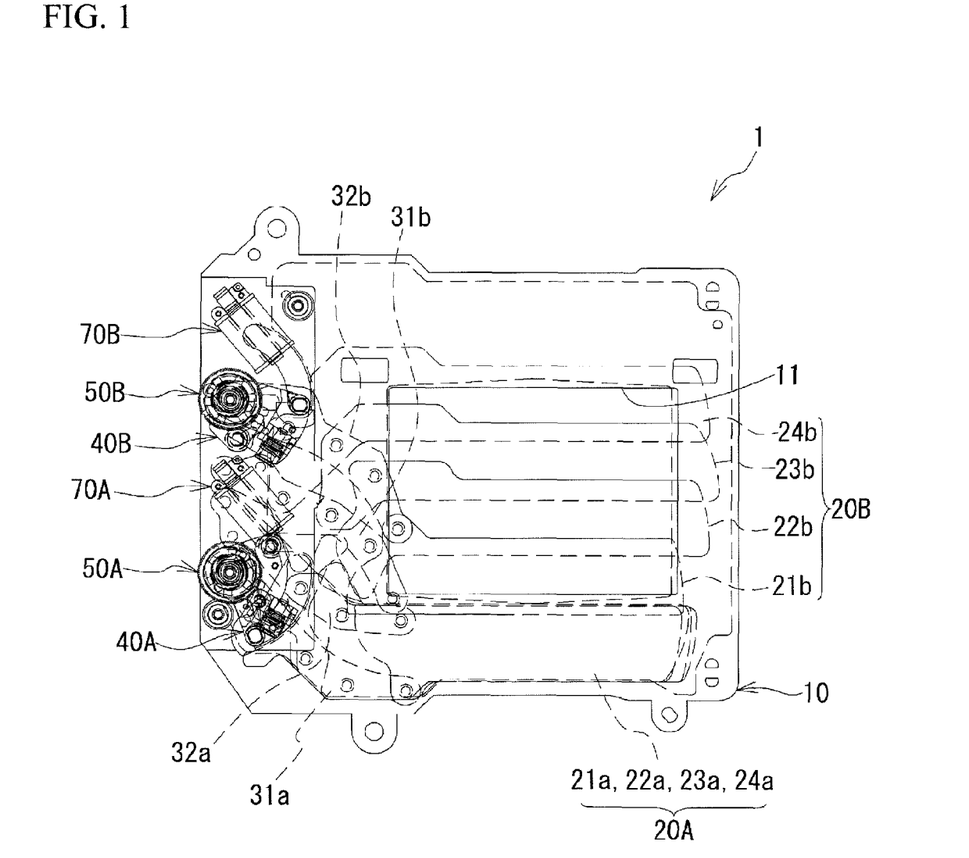
FIG. 1 is a front view of a focal plane shutter according to the present embodiment.

An embodiment will be described with reference to the drawings as follows. In the present embodiment, a focal plane shutter will be described as an example of a blade drive device. FIG. 1 is a front view of a focal plane shutter according to the present embodiment. As illustrated in FIG. 1, a focal plane shutter 1 includes: a board 10; blades 21a to 24a and 21b to 24b; drive arms 31a, 32a, 31b, and 32b; and electromagnets 70A and 70B. The board 10 is made of a synthetic resin, and includes an opening 11 with a rectangular shape. Each of the blades 21a to 24a and 21b to 24b is made of a synthetic resin and is thinly formed. Also, each of the drive arms 31a, 32a, 31b, and 32b is made of a metal sheet to retain its strength. Each of the blades 21a to 24a and 21b to 24b move between a position of receding from the opening 11 and a position of covering at least part of the opening 11.

Four blades 21a to 24a configure leading blades 20A. Four blades 21b to 24b configure trailing blades 20B. FIG. 1 illustrates the leading blades 20A in an overlapped state and the trailing blades 20B in an expanded state. In FIG. 1, the leading blades 20A recedes from the opening 11 and the trailing blades 20B close the opening 11.

The leading blades 20A are connected to the drive arms 31a and 32a. The trailing blades 20B are connected to the drive arms 31b and 32b. These drive arms 31a, 32a, 31b, and 32b are swingably supported by the board 10.

A leading blade-drive lever 40A and a trailing blade-drive lever 40B for respectively driving the drive arms 31a and 32b are provided in the board 10. The leading blade-drive lever 40A and the trailing blade-drive lever 40B are supported by the board 10 to be swingable in a predetermined range. Specifically, the leading blade-drive lever 40A is supported to swing about a spindle provided in the board 10. The swinging range of the leading blade-drive lever 40A is limited by a rubber, mentioned later, provided at an end portion of a slot formed in the board 10. This is applied to the trailing blade-drive lever 40B.

The drive arm 31a is connected to the leading blade-drive lever 40A. The drive arm 32b is connected to the trailing blade-drive lever 40B. The swinging of the leading blade-drive lever 40A causes the drive arm 31a to swing, thereby moving the leading blades 20A. Likewise, the swinging of the trailing blade-drive lever 40B causes the drive arm 32b to swing, thereby moving the trailing blades 20B.

The leading blade-drive lever 40A and the trailing blade-drive lever 40B each holds an iron piece which does not have a reference numeral. The leading blade-drive lever 40A can swing between the position where the iron piece abuts the electromagnet 70A and the position where the iron piece recedes from the electromagnet 70A. This is applied to the trailing blade-drive lever 40B.

Also, the leading blade-drive lever 40A is biased by a spring, not illustrated, in such a direction as to move away from the electromagnet 70A. Likewise, the trailing blade-drive lever 40B is biased by a spring, not illustrated, in such a direction as to move away from the electromagnet 70B.

Ratchet wheels 50A and 50B engage the leading blade-drive lever 40A and the trailing blade-drive lever 40B, respectively, through the springs mentioned above. One end of the spring, which biases the leading blade-drive lever 40A in such a direction as to move away from the electromagnet 70A, engages the ratchet wheel 50A. The other end of the spring engages the leading blade-drive lever 40A. The biasing force of the spring is adjusted by adjusting the rotational amount of the ratchet wheel 50A beforehand in assembling the focal plane shutter 1. The ratchet wheel 50B also has a function similar to that of the ratchet wheel 50A. The leading blades 20A and the trailing blades 20B of the focal plane shutter 1 are driven at the speed corresponding to the biasing force of the spring. For example, the leading blades 20A are driven faster as the rotational amount of the ratchet wheel 50A is larger. This configuration also is applicable to the trailing blades 20B. In the focal plane shutter 1 according to the present embodiment, the biasing force of the spring is set in assembling. After that, the leading blades 20A and the trailing blades 20B are always driven at a predetermined speed based on the set biasing force.

The electromagnet 70A is energized, thereby adsorbing the iron piece of the leading blade-drive lever 40A. Likewise, the electromagnet 70B is energized, thereby adsorbing the iron piece of the trailing blade-drive lever 40B.

Figure 2:
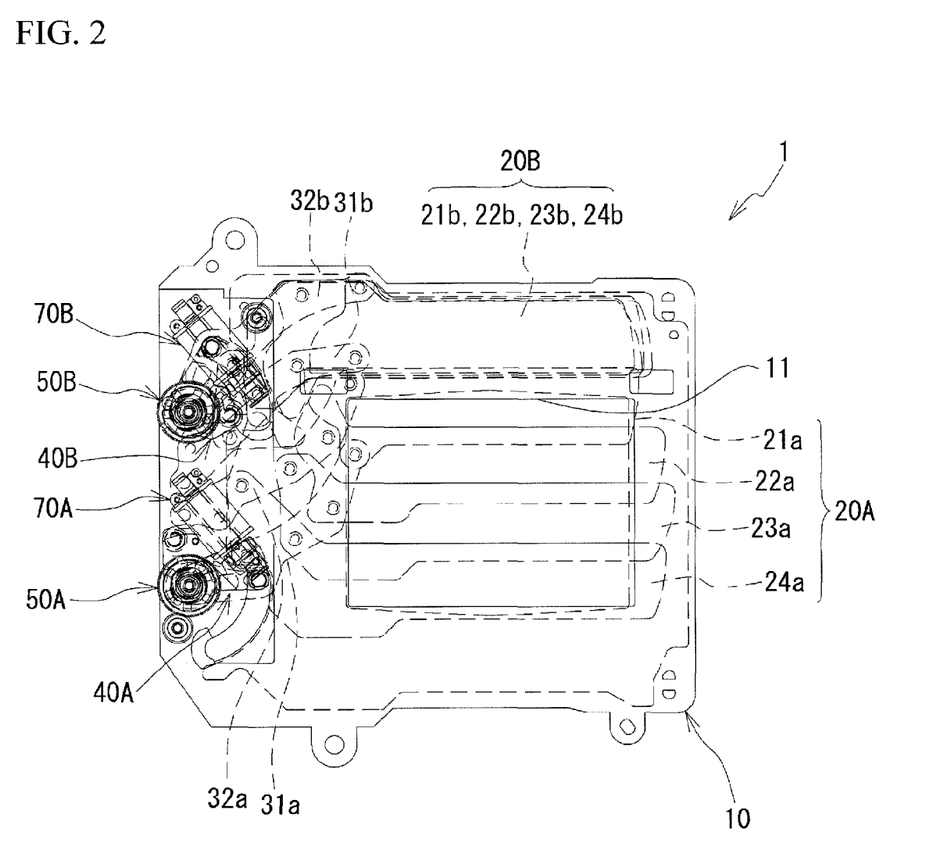
FIG. 2 is an explanatory view of an operation of the focal plane shutter.
Figure 3:
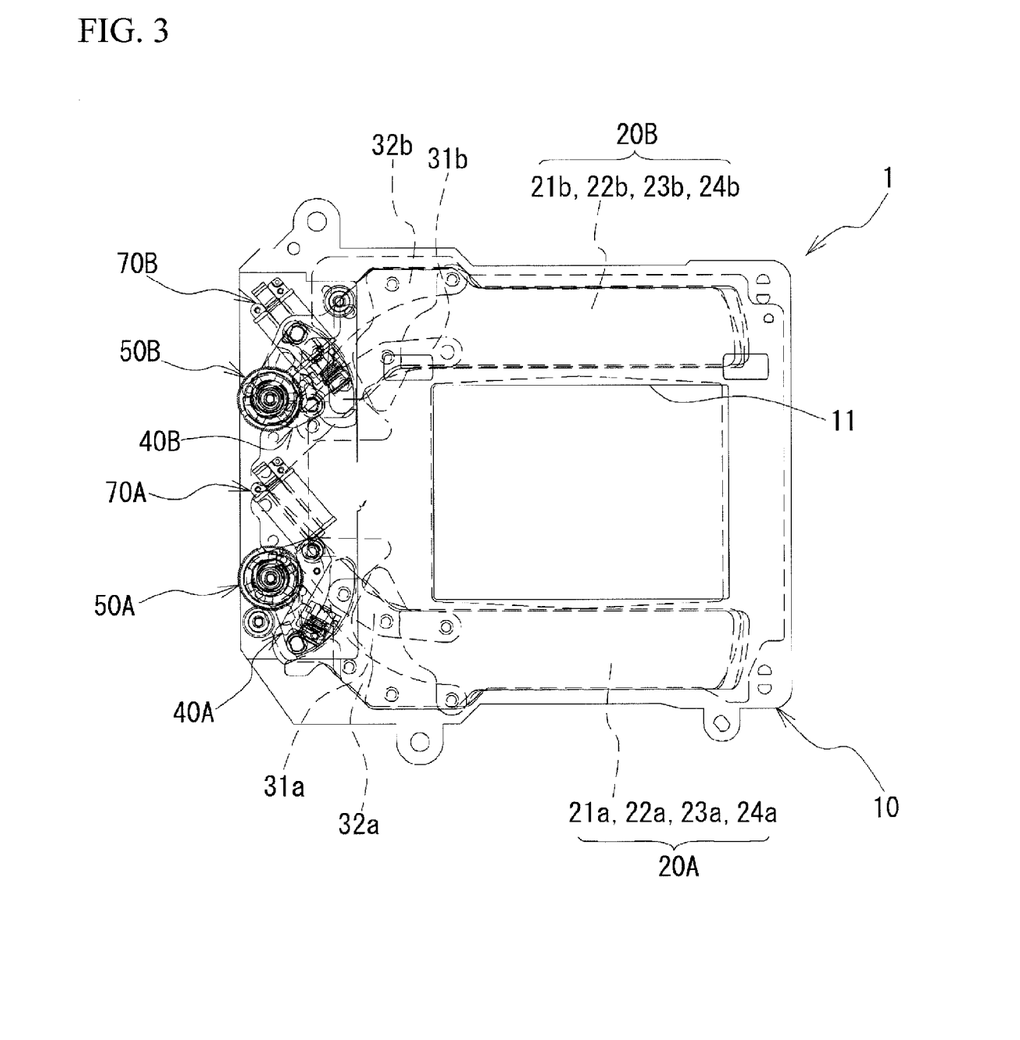
FIG. 3 is an explanatory view of the operation of the focal plane shutter.

Next, the operation of the focal plane shutter 1 will be described. FIGS. 1 to 3 are explanatory views of the operation of the focal plane shutter 1. Here, FIG. 2 illustrates the focal plane shutter 1 in an initial state. In this initial state, a set lever not illustrated is secured to an initial position, the leading blades 20A are expanded to close the opening 11, and the trailing blades 20B are overlapped each other to recede from the opening 11. In this initial state, the iron pieces of the leading blade-drive lever 40A and the trailing blade-drive lever 40B abut the electromagnets 70A and 70B respectively by the set lever, and are set in such an initial position as to be adsorbed to them respectively.

In shooting, a release button of the camera is pushed to energize coils of the electromagnets 70A and 70B, whereby the iron piece of the leading blade-drive lever 40A is adsorbed to the electromagnet 70A and the iron piece of the trailing blade-drive lever 40B is adsorbed to the electromagnet 70B. After that, the set lever moves away from the leading blade-drive lever 40A and the trailing blade-drive lever 40B. At this time, the leading blade-drive lever 40A and the trailing blade-drive lever 40B remain adsorbed to the electromagnets 70A and 70B, respectively.

Afterward, the energization of the coil of the electromagnet 70A is stopped, thereby rotating the leading blade-drive lever 40A in a clockwise direction by the biasing force of the spring as illustrated in FIG. 3. Therefore, the leading blades 20A move away from the opening 11 to be in the overlapped state. Also, the energization of the coil of the electromagnet 70B maintains for a predetermined period based on the exposure period, whereas the trailing blades 20B remain away from the opening 11.

This causes the opening 11 to be in an opened state. FIG. 3 illustrates an exposed state.

After a predetermined period lapses from a time when the release button is pushed, the energization of the coil of the electromagnet 70B is stopped, and then the trailing blade-drive lever 40B rotates clockwise by the biasing force of the spring. Therefore, the trailing blades 20B are expanded to close the opening 11. The trailing blade-drive lever 40B abuts a rubber, as will be mentioned later, for preventing bound, provided at an end of the slot formed in the board 10. FIG. 1 illustrates the state just after the exposure operation is finished. In such a way, one cycle of shooting is finished.

Next, the leading blade-drive lever 40A and the trailing blade-drive lever 40B are rotated counterclockwise by the set lever not illustrated. Therefore, the leading blades 20A are expanded to close the opening 11 and the trailing blades 20B are overlapped each other to recede from the opening 11, whereby the state is returned to the initial state illustrated in FIG. 2.

Figure 4:
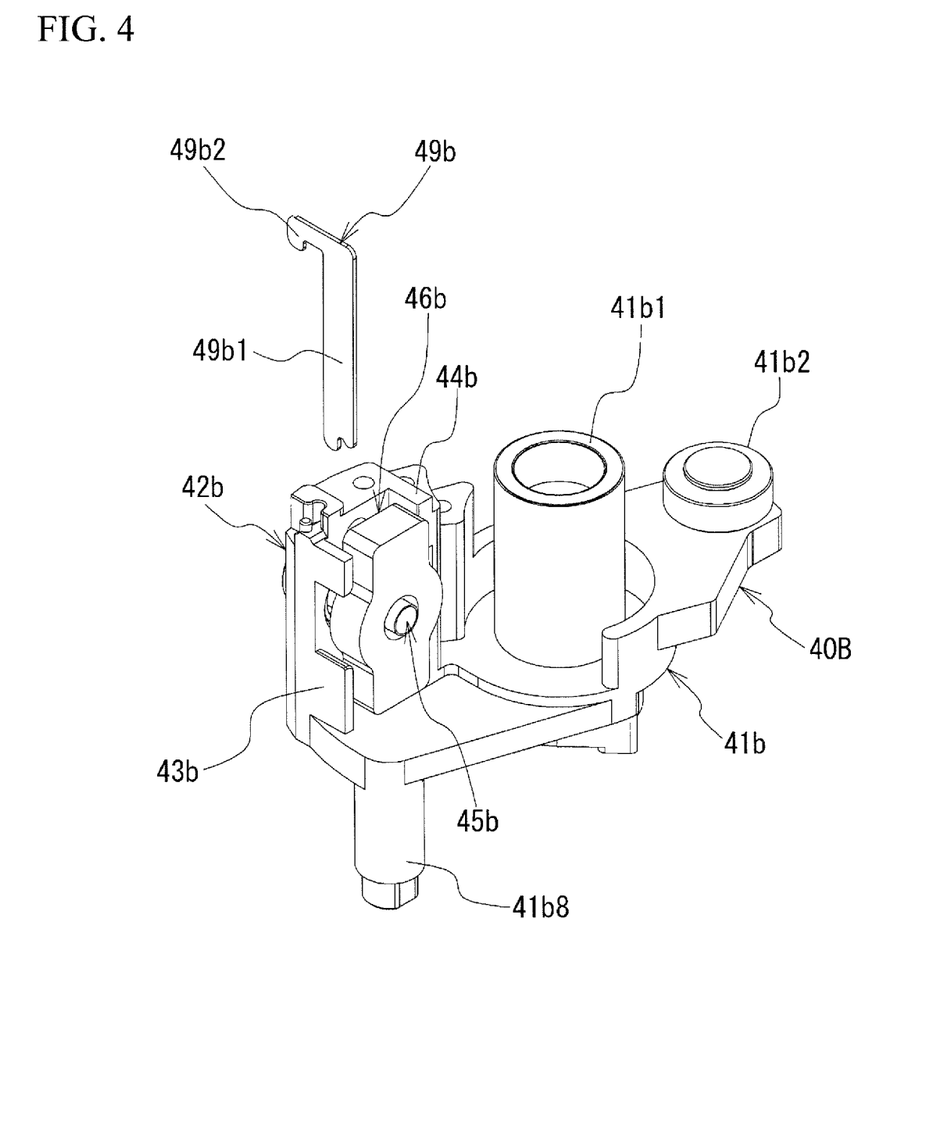
FIG. 4 is a perspective view of a trailing blade-drive lever.

Next, the drive lever will be described. Although the leading blade-drive lever 40A and the trailing blade-drive lever 40B differ in shape from each other, they substantially have the same configuration and the same parts. The following description will be given of only the trailing blade-drive lever 40B. FIG. 4 is a perspective view of the trailing blade-drive lever 40B. Firstly, an outline of the trailing blade-drive lever 40B will be described. Additionally, the structure is partially omitted in FIG. 4.

The trailing blade-drive lever 40B includes: a base portion 41b with a board shape; a cylindrical portion 41b1 standing on the base portion 41b; a roller portion 41b2; and a drive pin 41b8. The ratchet wheel 50B and a spring biasing the trailing blade-drive lever 40B are arranged around the cylindrical portion 41b1. Also, a spindle provided on the board 10 is fitted into the cylindrical portion 41b1. The trailing blade-drive lever 40B rotates a predetermined range about the spindle fitted into the cylindrical portion 41b1.

The roller portion 41b2 is pushed by a set lever not illustrated. The roller portion 41b2 is pushed by the set lever to rotate the trailing blade-drive lever 40B about the cylindrical portion 41b1. The drive pin 41b8 extends downwardly from the base portion 41b. The drive pin 41b8 is fitted into a hole formed in the drive arm 32b.

A support portion 42b is provided on the base portion 41b. The support portion 42b is provided for supporting an iron piece 46b. The iron piece 46b is adsorbed to the electromagnet 70B. The iron piece 46b is coupled to a spindle portion 45b. The spindle portion 45b is made of a metal. The iron piece 46b is formed into a rectangular shape with a given thickness. The support portion 42b includes: guide portions 43b and 44b along the side of the iron piece 46b. The guide portions 43b and 44b restricts the iron piece 46b from rotating about the spindle portion 45b.

A second biasing member 49b is inserted between the guide portion 43b and a side surface of the iron piece 46b. The second biasing member 49b is an elastically deformable spring with a plate shape. The second biasing member 49b includes: a base portion 49b1 extending linearly along the side surface of the iron piece 46b; and an engagement portion 49b2 continuous with the upper end of the base portion 49b1 and having an L shape when viewed from its side. The engagement portion 49b2 engages the support portion 42b and is held thereby. The second biasing member 49b is provided for biasing the iron piece 46b in a given direction and is provided for abutting the iron piece 46b with an iron core 73b in a stable posture.

Figure 5:
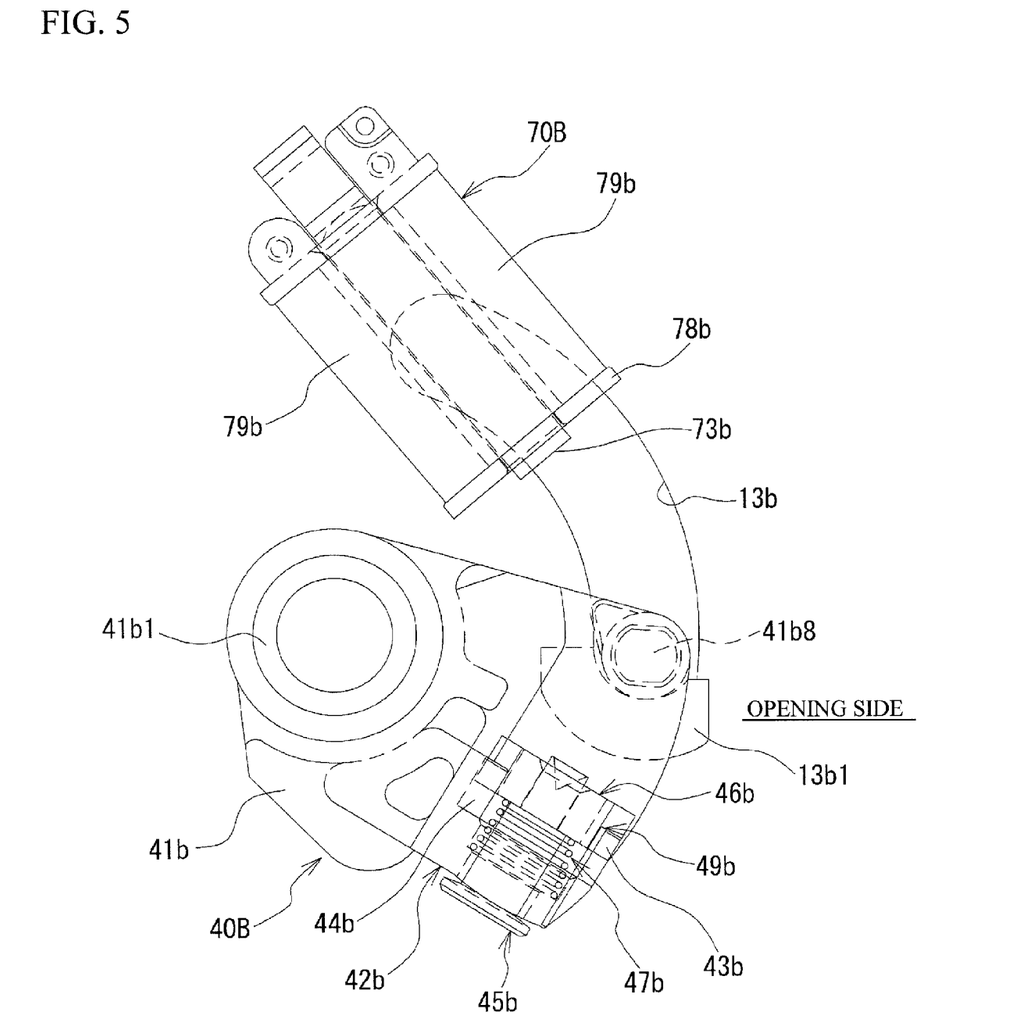
FIG. 5 is an explanatory view of an operation of the trailing blade-drive lever.
Figure 6:
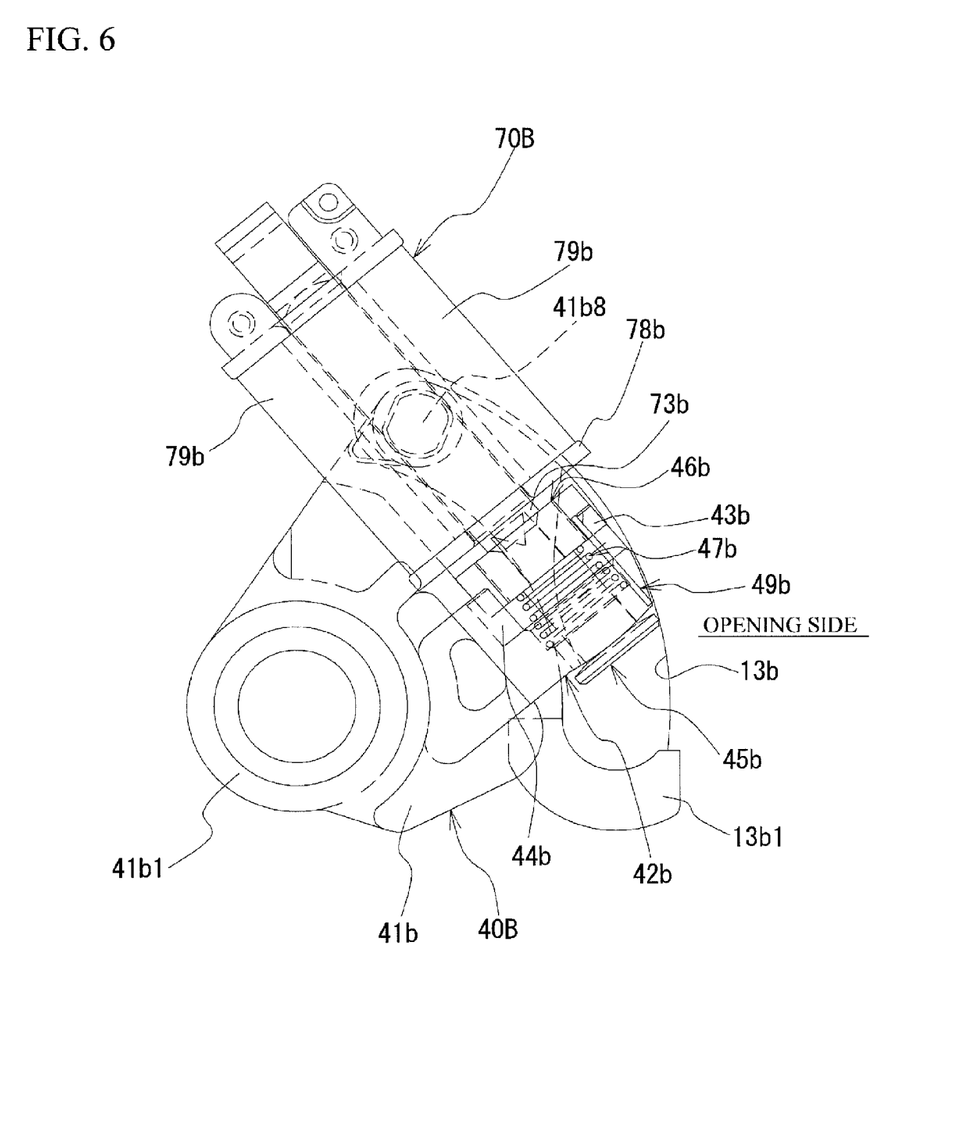
FIG. 6 is an explanatory view of the operation of the trailing blade-drive lever.

Next, an operation of the trailing blade-drive lever 40B will be described. FIGS. 5 and 6 are explanatory viewed of the operation of the trailing blade-drive lever 40B. The structure of the trailing blade-drive lever 40B is partially omitted in FIGS. 5 and 6. FIG. 5 illustrates a state where the trailing blade-drive lever 40B is spaced apart from the electromagnet 70B. FIG. 6 illustrates a state where the iron piece 46b of the trailing blade-drive lever 40B is adsorbed to the electromagnet 70B. The opening 11 is located in the right side of the trailing blade-drive lever 40B in FIGS. 5 and 6.

The board 10 is formed with an arc-shaped slot 13b for escaping the movement of the drive pin 41b8. Also, the slot 13b is provided at its one end portion with a rubber 13b1 for preventing the drive pin 41b8 from bounding. The electromagnet 70B includes: the iron core 73b; a coil 79b for exciting the iron core 73b; and a bobbin 78b around which the coil 79b is wound. The energization of the coil 79b generates the magnetic attraction force in the iron core 73b.

The trailing blade-drive lever 40B is rotated about the cylindrical portion 41b1 counterclockwise by the set lever from a state illustrated in FIG. 5. Therefore, the drive pin 41b8 moves within the slot 13b and then the iron piece 46b abuts the iron core 73b. Afterward, the coil 79b is energized, and then the iron piece 46b is adsorbed to the iron core 73b. As long as the coil 79b is energized even after the set lever recedes, the iron piece 46b is continuously adsorbed to the iron core 73b. When the energization of the coil 79b is stopped, the magnetic attraction force generated between the iron piece 46b and the iron core 73b disappears, and then the trailing-blade drive lever 40B is rotated clockwise by the biasing force of the spring not illustrated. The trailing blade-drive lever 40B is operated in such a way.

Additionally, the iron piece 46b engages the spindle portion 45b and is capable of reciprocating axially with respect thereto. A first biasing member 47b is provided between the support portion 42b and the iron piece 46b. The first biasing member 47b is a spring with a coil shape. The spindle portion 45b is inserted into the first biasing member 47b. The first biasing member 47b biases the iron piece 46b toward the axial direction of the spindle portion 45b, that is, toward the electromagnet 70B.

Herein, in the present embodiment, the iron piece 46b and the iron core 73b are made of pure iron (SUY), and plating thereof ensure a desired hardness by having heated the pure iron after performing an electroless nickel plating process on the pure iron. The base material of the iron piece 46b and the iron core 73b may be any soft magnetic material other than the pure iron.

A Vickers hardness of the plating of the iron piece 46b is greater than that of the plating of the iron core 73b. In particularly, the Vickers hardness of the plating of the iron piece 46b is 950 HV plus or minus 50 HV. The Vickers hardness of the plating of the iron core 73b is 750 HV plus or minus 50 HV. Thus, the difference in the Vickers hardness between the plating of the iron piece 46b and the plating of the iron core 73b is 100 HV or more and 300 HV or less. Also, the Vickers hardness of the plating of the iron piece 46b is 900 HV or more and 1000 HV or less. The Vickers hardness of the plating of the iron core 73b is 700 HV or more and 800 HV or less. Additionally, the same configuration is applicable to the iron piece of the leading blade-drive lever 40A and the iron core of the electromagnet 70A.

Figure 7A:
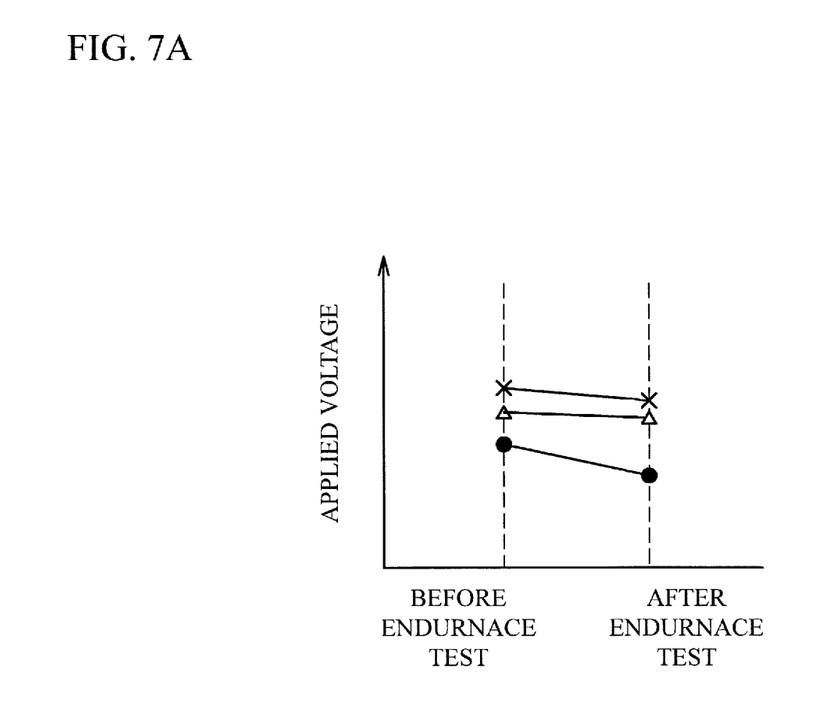
FIG. 7A is a graph of a change in voltage which was applied to an electromagnet and which was needed for generating a constant adsorption force between an iron piece and an iron core before and after an endurance test of the focal plane shutter according to the present embodiment.

A change in the adsorption force between the iron piece 46b and the iron core 73b was verified before and after an endurance test of the focal plane shutter 1 according to the present embodiment. Specifically, the voltage which was applied to the coil 79b and which was needed for generating a constant adsorption force between the iron piece 46b and the iron core 73b was measured before and after the endurance test of the focal plane shutter 1 according to the present embodiment. In the endurance test, the trailing blade-drive lever 40B reciprocated several times such that the iron piece 46b abutted the iron core 73b several times. FIG. 7A is a graph of the change in the voltage which was applied to the electromagnet 70B and which was needed for generating a constant adsorption force between the iron piece 46b and the iron core 73b before and after the endurance test of the focal plane shutter 1 according to the present embodiment. The change of the voltage applied to the electromagnet 70B was verified by use of three samples under the same condition before and after the endurance test.

As illustrated in FIG. 7A, the voltage which was applied to the coil 79b and which was needed for generating a constant adsorption force between the iron piece 46b and the iron core 73b was not greatly changed before and after the endurance test. This means that the adsorption force between the iron piece 46b and the iron core 73b was not greatly changed even in a case where a constant voltage was applied to the electromagnet 70B before and after the endurance test.

Figure 7B:
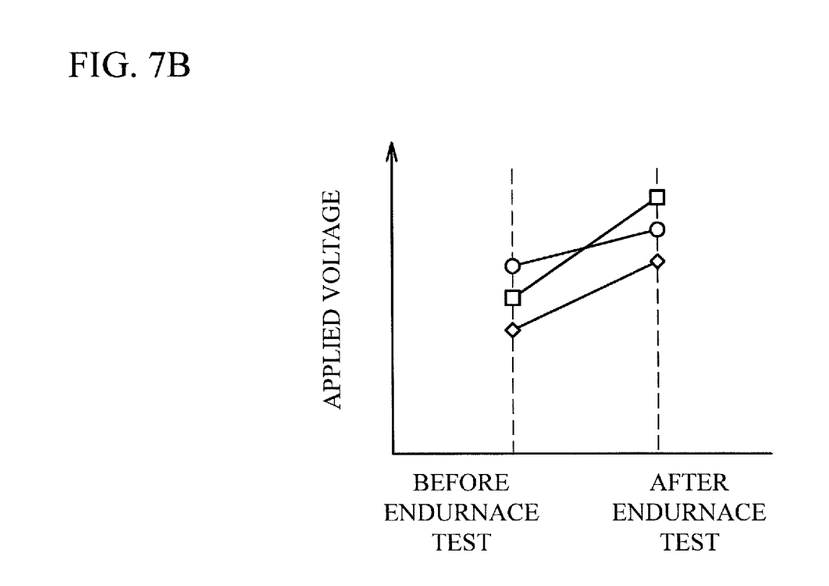
FIG. 7B is a graph of a change in voltage which was applied to an electromagnet and which was needed for generating a constant adsorption force between an iron piece and an iron core before and after an endurance test of a focal plane shutter according to the comparative example.

Next, a comparative example will be described. In the comparative example, by use of a focal plane shutter equipped with an iron piece and an iron core each having a Vickers hardness of the plating of about 750 HV, the voltage which was applied to an electromagnet and which was needed for generating a constant adsorption force between the iron piece and the iron core was measured before and after the endurance test. FIG. 7B is a graph of a change in the voltage which was applied to the electromagnet and which was needed for generating a constant adsorption force between the iron piece and the iron core before and after the endurance test of the focal plane shutter according to the comparative example.

As illustrated in FIG. 7B, the voltage which was applied to the electromagnet and which was needed for generating a constant adsorption force after the endurance test was higher than that before the endurance test. In other words, in a case where the same voltage was applied to the electromagnet, the adsorption force generated between the iron piece and the iron core after the endurance test was lower than that before the endurance test.

The reason is considered as follows. The iron piece and the iron core in the comparative example are the same in the Vickers hardness, and the Vickers hardness of the iron piece in the comparative example is smaller than that of the iron piece 46b in the present embodiment. Thus, the iron piece in the comparative example is easy to be worn down. For this reason, the adsorption surface of the iron piece is attached with abrasion powder or is deformed to be uneven. Thus, an air gap is formed between the iron piece and the iron core, and the area of the absorption is reduced. Therefore, supposedly, a reduction in the spatial magnetic flux density or a reduction in the surface magnetic flux density causes a reduction in the adsorption surface.

Actually, the voltage with the same value is applied to the electromagnet in a camera. Thus, the long-term use of a camera with the focal plane shutter according to the comparative example causes a reduction in the adsorption force. This causes a reduction in the period from the time when the energization of the electromagnet is stopped to the time when the iron piece is moved away from the iron core by the biasing force of the biasing member. As a result, the timing when the blades start moving might be advanced to influence the exposure period.

In the focal plane shutter 1 according to the present embodiment, the adsorption force is not greatly changed before and after the endurance test. This is conceivably because it becomes difficult to wear down the iron piece 46b due to the Vickers hardness of the plating of the iron piece 46b which is greater than that of the plating of the iron core 73b. Accordingly, in the focal plane shutter 1 according to the present embodiment, a reduction in the adsorption force is suppressed even for long-term use. Therefore, even when the focal plane shutter 1 is used for a long time, the constant exposure period can be maintained, thereby suppressing the error of the exposure period from increasing.

According to the experiment results, it is difficult to reduce the adsorption force between the iron piece 46b and the iron core 73b under the condition that the difference in the Vickers hardness between the plating of the iron piece 46b and the plating of the iron core 73b is 100 HV or more. Also, if the manufacturing cost or the like is considered, it is preferable that the difference in the Vickers hardness between the plating of the iron piece 46b and the plating of the iron core 73b should be 300 HV or less. Also, it is preferable that the Vickers hardness of the plating of the iron piece 46b should be 900 HV or more and 1000 HV or less. It is preferable that the Vickers hardness of the plating of the iron core 73b should be 700 HV or more and 800 HV or less.

Additionally, the present invention may be applied to a self-holding electromagnet. As for the self-holding electromagnet, a permanent magnet which gives magnetic force to an iron core is fixed thereto, and the iron core can adsorb and hold an iron piece in a non-energization state. The enegization of a coil wound around the iron core generates a magnetic field around the coil so as to reduce the magnetic force of the permanent magnet.

Therefore, the adsorption force between the iron core and the iron piece is reduced, whereby a drive lever is driven by the biasing force such that the iron piece is moved away from the iron core. Even when such a self-holding electromagnet employs the iron piece 46b and the iron core 73b in the present embodiment, it is possible to ensure the constant period from the time when the energization is started to the time when the iron piece 46b is moved away from the iron core 73b, and it is possible to ensure the constant exposure period.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment can be employed in an optical device such as a still camera or a digital camera.

Finally, several aspects of the present invention are summarized as follows.

According to an aspect of the present invention, there is provided a focal plane shutter including: a board including an opening; a blade opening or closing the opening; an electromagnet including an iron core and a coil for energizing the iron core; and a drive lever holding an iron piece capable of being adsorbed to the iron core, capable of moving such that iron piece is moved into and away from the iron core, and driving the blade, wherein a plating process is performed on the iron core and the iron piece, a Vickers hardness of a plating of the iron piece is greater than that of a plating of the iron core, and a difference in the Vickers hardness between the plating of the iron piece and the plating of the iron core is 100 HV or more.

According to another aspect of the present invention, there is provided an optical device including the above focal plane shutter.

What is claimed is:

1. A focal plane shutter comprising:
   a board including an opening;
   a blade opening or closing the opening;
   an electromagnet including an iron core and a coil for energizing the iron core; and
   a drive lever holding an iron piece capable of being adsorbed to the iron core, capable of moving such that iron piece is moved into and away from the iron core, and driving the blade,
   wherein a plating process is performed on the iron core and the iron piece,
   a Vickers hardness of a plating of the iron piece is greater than that of a plating of the iron core, and
   a difference in the Vickers hardness between the plating of the iron piece and the plating of the iron core is 100 HV or more.

2. The focal plane shutter of claim 1 wherein the difference in the Vickers hardness between the plating of the iron piece and the plating of the iron core is 300 HV or less.

3. The focal plane shutter of claim 1 wherein the difference in the Vickers hardness between the plating of the iron piece and the plating of the iron core is 900 HV or more and 1000 HV or less.

4. The focal plane shutter of claim 1 wherein the difference in the Vickers hardness between the plating of the iron piece and the plating of the iron core is 700 HV or more and 800 HV or less.

5. The focal plane shutter of claim 1 wherein an electroless nickel plating process is performed on the iron core and the iron piece.

6. An optical device comprising a focal plane shutter comprising:
   a board including an opening;
   a blade opening or closing the opening;
   an electromagnet including an iron core and a coil for energizing the iron core; and
   a drive lever holding an iron piece capable of being adsorbed to the iron core, capable of moving such that iron piece is moved into and away from the iron core, and driving the blade,
   wherein a plating process is performed on the iron core and the iron piece,
   a Vickers hardness of a plating of the iron piece is greater than that of a plating of the iron core, and a difference in the Vickers hardness between the plating of the iron piece and the plating of the iron core is 100 HV or more.

\* \* \* \* \*